July 18, 1972 W. F. MORRISON ET AL 3,677,715
CATALYTIC CRACKING APPARATUS
Filed April 13, 1970
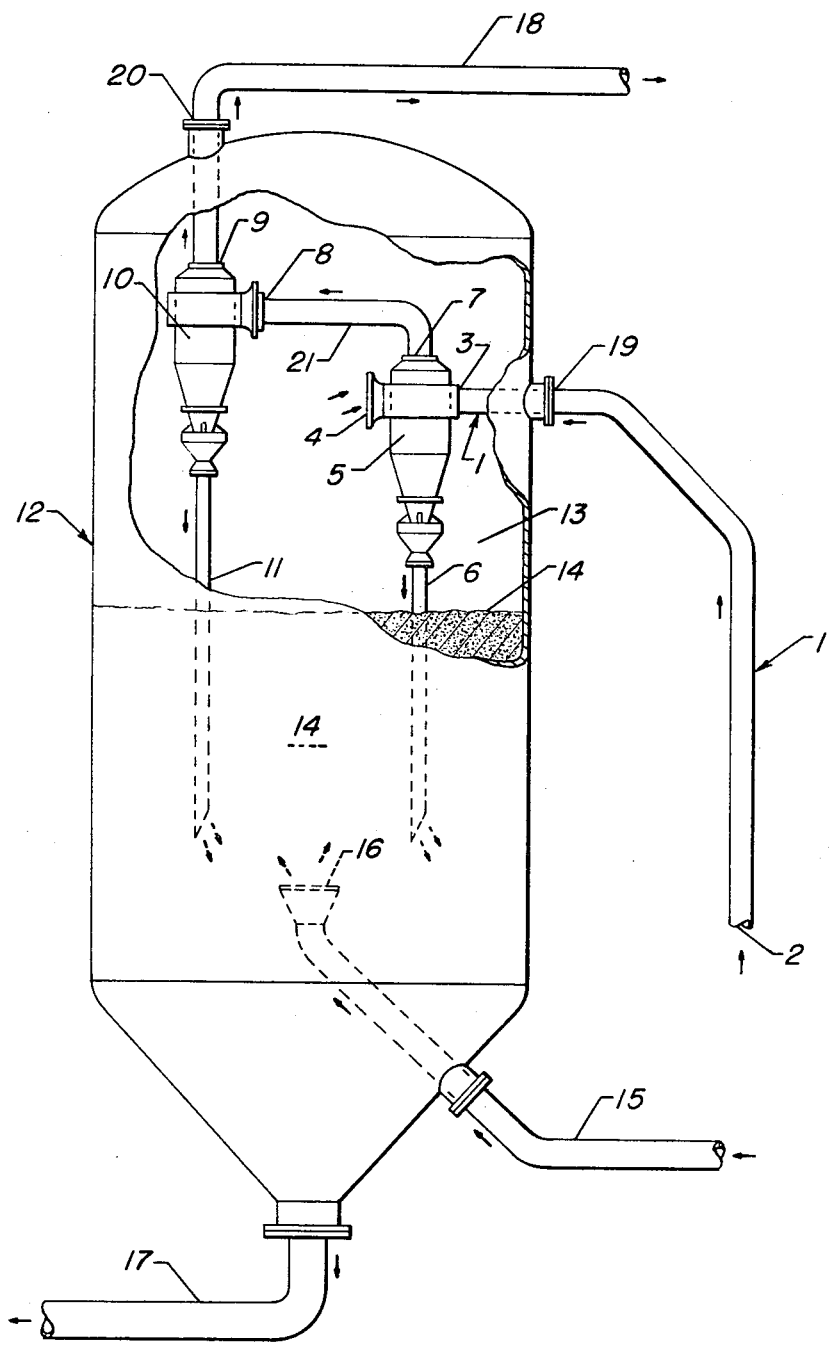
INVENTORS:
William F. Morrison
Henry A. Hauser
BY: James R. Hoatson, Jr.
Robert W. Erickson
ATTORNEYS

United States Patent Office 3,677,715
Patented July 18, 1972

3,677,715
CATALYTIC CRACKING APPARATUS
William F. Morrison, Purley, and Henry A. Hauser, Sevenoaks, England, assignors to Universal Oil Products Company, Des Plaines, Ill., and Ambuco Limited, London, England, fractional part interest to each
Filed Apr. 13, 1970, Ser. No. 27,944
Int. Cl. B01d 45/12; B01j 9/20; C10g 13/18
U.S. Cl. 23—288 S       2 Claims

ABSTRACT OF THE DISCLOSURE

Catalytic cracking apparatus comprising an elongated transfer line conduit connected to a reception vessel said transfer line conduit being connected to a series of cyclone separation means which are within said reception vessel. The transfer line conduit is connected to the inlet of a first cyclone separation means which is located within the reception vessel. The first cyclone separation means contains an inlet which is in communication with the internal portion of said reception vessel. The first cyclone separation means is connected to a second cyclone separation means which accepts material from the outlet of said first cyclone separation means and passes a portion of those materials out of the second cyclone separation means through an outlet which passes out of the reception vessel.

Field of the invention

The field of art to which this application pertains is catalytic cracking apparatus. More specifically, the disclosed apparatus relates to a catalytic cracking apparatus arrangement in which an elongated transfer line conduit, typically referred to as a riser type reaction zone, is connected to a reception vessel, commonly referred to as a dense phase fluidized bed reaction zone, in a manner which allows a cyclone arrangement to efficiently separate catalyst from oil from the transfer line conduit and from a fluidized bed in the reception vessel.

Description of the prior art

The prior art abounds with a catalytic cracking apparatus directed towards the separation of catalyst and oil from both dense phase reaction zones, that is reaction zones in which a fluidized catalyst present therein is in a relatively dense phase arrangement, or the separation of catalyst and oil from diluent phase reaction zones which are typically referred to as riser type reaction zones in which catalysts and oil move at a velocity sufficiently fast to prevent catalyst from accumulating in any given portion of the riser.

In the catalytic cracking field of recent import has been the adaption of many present day catalytic cracking processes to the production of large quantities of gasoline which necessitates maximizing the gasoline production from effluent products from a typical fluidized catalytic cracking reaction zone. Of recent significance in the field of fluidized catalytic cracking are processes in which the light cycle oils produced during the catalytic cracking reaction are recycled to the cracking zone for further conversion to gasoline components. Depending upon the nature of the light cycle oil it can or cannot be hydrotreated prior to passage into a catalytic cracking reaction zone to be cracked at conditions which allow the cracking of the bicyclics present in the light cycle oil to monocyclic aromatics such as benzene, toluene, or xylenes which are relatively high octane components.

In many instances it is desired that the light cycle oil being recracked be passed into a catalyst reaction zone containing catalyst which is not as active as the catalyst which contacts the fresh feed. In other instances it is desired that the light cycle oil recycle be passed to a catalyst cracking reaction zone which does not contain appreciable quantities of fresh feed stock or cracked products from the fresh feed stock. It is generally felt that the cracking of light cycle oil in the presence of a fresh feed material or cracked products therefrom allows sufficient hydrogen transfer to the cracked products from the light cycle oil to reduce the yield of olefinic light gaseous components.

In an effort to design apparatus to sufficiently meet the requirements of the above described trends in catalytic cracking, many types of catalytic cracking apparatus have been disclosed which combine the diluent phase fluidized cracking of a fresh feed stock and the fluidized dense phase cracking of a recycle oil stream originally produced by the diluent phase fluidized cracking of the fresh feed. Typically, such processes require apparatus design which allows the passage of fresh feed and catalyst from a diluent phase riser type reaction zone into another reception or reaction vessel in which a portion of or all of the catalyst removed from the riser cracking zone can contact the recycle stream under dense phase fluidized reaction conditions. Typically most prior art apparatus involving catalytic cracking processes where the dilute phase and dense phase cracking techniques are employed use a riser type reaction zone which passes into the bottom of a reception vessel which contains a dense phase bed of fluidized catalytic cracking catalyst. This particular type of apparatus arrangement is not suitable because of the aforementioned effects of hydrogen in transfer when fresh feed or fresh feed reaction products are allowed to be present with a recycle cycle oil which is passed into the dense phase fluidized bed of catalyst in the reception vessel.

The apparatus of this invention allows a riser type reaction zone and a dense phase reaction zone to be designed in a manner which allows the effluent material from the riser type reaction zone which comprises catalyst and cracked products to pass into a first cyclone separation means located within a reception vessel for the relatively quick separation of catalyst and hydrocarbons after which the hydrocarbons are passed into a second cyclone separation means along with any entrained catalyst for a more efficient and further separation of catalyst and hydrocarbon. The feed stock passed into the reception vessel, that is the material which passes into the dense phase fluidized catalyst present at the lower portion of said reception vessel, is a recycle stream and also passes into said first cyclone separation means for separation of any entrained catalyst from hydrocarbon effluent. A relatively catalyst free hydrocarbon stream withdrawn from the first cyclone separation means is passed into a second cyclone separation means which is also located with said reception vessel. The hydrocarbons pass out of the second cyclone separation means to fractionation equipment for the separation of the effluent stream into various hydrocarbon components including light gases, liquid petroleum products, gasolines and the cycle oils.

SUMMARY OF THE INVENTION

It is an object of the present invention to present a catalytic cracking apparatus which apparatus allows both diluent phase and dense phase fluidized catalytic cracking of fresh and recycle feed stocks. It is another object of the present invention to present a catalytic cracking apparatus for the dilute phase and dense phase fluidized cracking of feed and recycle stocks, which apparatus allows a relatively quick separation of catalyst and oil passing out of the riser diluent phase type reaction zone while also providing apparatus to separate entrained catalysts from oil passing out of the dense phase fluidized bed of catalyst.

In this specification diluent phase catalytic cracking conditions shall include a fully expanded fluidized bed of catalyst in which the solid catalyst particles are so widely separated that they exert essentially no influence upon each other. Commonly, this situation exists when the gas velocity at all points in the diluent phase system exceeds the terminal settling velocity of the solids and the particles can be lifted and continuously conveyed by the vapor. A more simplified description would be conditions where the vapor and the solid catalyst particles flow or are flowing in the same direction. The dilute phase fluidized conditions are typically present in riser type reaction zones.

Relatively dense phase fluidized bed conditions are generally those conditions in which a bed of a solid catalyst and typically a catalytic cracking catalyst is in a state of suspension with a vapor flowing through the solid bed of catalysts. The overall vapor velocity through the bed of catalysts is generally less than the terminal settling velocity of the solid catalyst particles. When referring to dense phase fluidized conditions in this specification the overall flow of vapor and catalyst particles shall be considered to be counter-current. In some instances the vapor passing through the bed of catalyst may entrain portions of the catalyst, but for the most part, the catalyst flow in the dense phase fluidized bed is counter-current to the vapor flow passing into the dense fluidized bed of catalyst.

The vessels and different reaction zones and the cyclone separation means along with all inlet and outlet lines and all transfer lines included as part of the apparatus of the present invention can be constructed from any suitable metal. The metals used in the construction of various pieces or parts of the apparatus disclosed herein should be of such a nature as to withstand temperatures of from about 600° F. to about 1500° F. and not be easily worn away by contact with catalyst of a small particle size. Typical of the metals which can be used include carbon steel with erosion resistant linings, the stainless steel metals and various alloys derived therefrom, including metals containing chromium and nickel and other materials which form strong and high abrasion resistant alloys.

The cyclone separation means as described herein shall generally encompass an apparatus which by application of centrifugal type separation allows the separation of vapors from solid catalyst particles. Typically, a feed material passing through the cyclone separation means tangentially enters the cyclone near the top of the cyclone and is given a spinning motion as it enters the cyclone chamber proper. The tangential velocity of the particles tends to carry them toward the periphery of the chamber. A spiral motion of the fluid results in some inward radial acceleration of the particle, and simultaneously gravitational force imparts downward acceleration of the catalyst particle. The result is a downward and spiraling path of increasing radius until the catalyst particle reaches the boundary or the inner portion of the cyclone chamber. Thereafter the particles continue down the wall and the vapor, free of solids, moves upward in the central core of the cyclone chamber and out of the cyclone at its outlet port which is generally located at the uppermost portion of the cyclone chamber. At high tangential velocities, the outward force on the particle is many times the force of gravity, hence cyclones accomplish more rapid and more effective separation than gravitational-settling chambers for particles of sizes down to a few microns in diameter. For very small particle sizes, the energy represented by the tangential velocity is insufficient to overcome the centrifugal force of the rotating fluid and the separation thus becomes ineffective.

The cyclone separation means has a solids outlet at their lowermost portion near the neck or the most narrow portion of the cone portion of the cyclone. At the solids outlet of the cyclone is located a dip-leg through which the catalyst exits the cyclone. The dip-leg is long enough to be immersed in the dense bed of fluidized catalyst which is located at the lower portion of the reception vessel or can be sealed with a trickle valve. These dip-legs may or may not reach into the fixed bed of catalyst. The sealing of the dip-legs helps prevent catalyst from being entrained with vapors passing out of the dense phase fluidized bed of catalyst.

DETAILED DESCRIPTION OF THE DRAWING

The apparatus depicted in the accompanying drawing shows the catalytic cracking apparatus disclosed herein. The reception vessel 12 is a relatively large diameter vessel as compared with riser type reaction zone 1. Riser type reaction zone 1 as shown is located substantially vertically and externally to reception vessel 12 and is a relatively elongated conduit through which catalyst from a regeneration zone and a fresh feed stream are admixed at the lower portion of said riser type reaction zone and enter said riser type reaction zone 1 near the inlet portion 2 of the riser type reaction zone wherein feed is vaporized by contact with the hot catalyst. The vaporized feed carries small particles of catalyst in an upward direction through the riser type reaction zone and into cyclone separation means 5. The riser type reaction zone passes through the wall of the reception vessel 12 at point 19 and enters cyclone separation means 5 at its inlet 3. Cyclone separation means 5 is connected to cyclone separation means 10 in a direct manner so that the outlet of separation means 5, labeled 7, is in communication with the inlet 8 to cyclone separation means 10. Typically the vapor outlet for cyclone separation means 5 and the inlet of cyclone separation means 10 are connected by some sort of flow conduit labeled 21. Riser type reaction zone 1 as depicted in the drawing is an open communication with inlet 3 of cyclone separation means 5 and is constructed in such manner as to be essentially a self-containing conduit with no direct means of material passing therethrough of passing into reception vessel 12 prior to passing into cyclone separation means 5.

Reception vessel 12 is a relatively large vessel and contains cyclone separation means 5 and 10 along with other interconnecting conduits, inlets and outlets. The fluid cracking apparatus is constructed in a manner to allow a dense phase fluidized bed of cracking catalyst to accumulate at the lower portion of said reception vessel 12 and is depicted by the shaded area labeled 14 in the drawing. Area 13 within reception vessel 12 is the relatively diluent phase area of material present within reception vessel 12 and contains a relatively small amount of catalyst when compared to Area 14.

On reception vessel 12 there is a catalyst outlet 17 which is located in the lower portion of reception vessel 12. This catalyst outlet allows the catalyst which is passed into reception vessel 12 via the riser reaction zone 1 to be withdrawn from vessel 12 and be passed into a catalyst regeneration zone which effects the burning off of carbon or carbonaceous type materials from the catalyst by contact therein with an oxygen containing gas. In most instances a stripping stream contacts the catalyst passing through line 17 to effect a partial or substantially total stripping of hydrocarbons from the spent catalyst. The stripping medium is generally steam. The catalyst after being steam stripped contains generally only coke which is burned in the regeneration zone. The stripping medium in certain instances is controlled at a rate which allows it to be passed through the dense bed 14 and out of the system via cyclones 5 and 10 and through outlet 18. Also shown on vessel 12 is recycle or combined feed inlet line 15 which is connected to reception vessel 12 at a lower portion thereof and in such a manner as to allow the outlet from this line to be located below the uppermost portion of the dense phase fluidized bed of partially deactivated catalyst located in vessel 12. Recycle or combined feed is passed through line 15 into the dense phase bed of fluidized catalyst and enters the bed at point 16 below the uppermost portion of the dense phase fluidized bed of partially deactivated catalyst. It is preferred but not necessarily a limitation that the recycle stream contain a minimum of fresh feed sock because of the aforementioned hydrogen transfer problems associated with a combined stream of fresh feed and a recycle stream. Most all of the vaporous hydrocarbon material passes through outlet 18 with the exception of that material present on the partially deactivated catalyst which is withdrawn from reception vessel 12 via outlet line 17. Outlet line 18 leaves reception vessel 12 at point 20 and is in direct communication with the outlet of cyclone separation means 10 at its vapor outlet portion 9.

As is indicated the cyclone separation means 5 and 10 contain at their lower portion dip-legs 6 and 11 respectively, which are designed to allow catalyst separated from the vapor and catalyst mixtures passed into the respective separation means to be withdrawn and passed into the dense phase fluidized bed of partially deactivated catalyst 14 below its uppermost boundary. Since the reception vessel is designed to allow a recycle oil to be passed into its lowermost portion via recycle feed stream 15, there is provided on cyclone separation means 5 an additional inlet 4 which allows the vapors including stripped vapors withdrawn from the dense phase fluidized bed of partially deactivated catalyst to be passed into separation means 5 so that any catalyst entrained therewith may be separated along with the catalyst-vapor mixture passed into separation means 5 from the riser type reaction zone 1.

As can be seen from detailed description of the drawing the particular apparatus disclosed herein allows the catalyst-vapor mixture which is withdrawn from the riser type reaction zone to be separated in a relatively quick manner by cyclone separator 5 followed by the passage of the relatively catalyst free vapors into cyclone separation means 10 for the final separation of catalyst from oil vapors.

In the proper design of the various cyclone separation means employed in the apparatus disclosed herein, it is contemplated that the first cyclone separation means be able to separate the catalyst and vapors from the riser type reaction zone 1 in a quick manner along with vapors and entrained catalyst from the dense phase fluidized bed of catalyst without a particularly large emphasis placed on the separating efficiency of this cyclone. Cyclone separation means 10 is the second cyclone separation means that vapor and catalyst are passed into is a relatively high efficiency catalyst cyclone separation zone to prevent catalyst from passing out of the system via vapor outlet 18. Because of the fact that most of the catalysts and vapors have been separated by separation means 5, in some instances cyclone separation means 10 can allow the catalyst and oil to contact each other for a longer period of time to allow the substantially complete separation of catalyst from oil vapors without encountering additional cracking of the oil vapors. In other instances the catalyst and oil contact time in cyclone separation means 10 is quite short which may prevent any reaction from taking place therein. The relatively low ratio of catalyst over oil in the material passing from the first cyclone to the second cyclone through line 21 is not effective towards influencing cracking reactions and for the most part there is very little reaction of vapors to lighter components in either of the cyclone separation zones.

The cyclone separation means as shown comprise two separate and distinct zones. The individual cyclone separation means can be made up of more than one cyclone and in many instances can comprise two cyclones operating in a parallel arrangement. When either or both cyclone separation means comprise more than one cyclone the flow of materials through the apparatus remains the same as described in above, that is, all of the vapors removed from the reception vessel 12 at outlet 18 pass through the first cyclone separation means and then directly into the second cyclone means.

The first cyclone separation means, as previously described contains two inlets. One inlet receives the riser reaction zone catalyst oil effluent while the other inlet receives the catalyst oil mixture including stripped vapors and stripping steam being withdrawn from the dense phase fluidized bed of catalyst within the reception vessel. The latter inlet is in open communication with the interior portion of the reception vessel and may be located on conduit 1 within vessel 12 or directly on any portion of the first cyclone separation so a minimum disturbance is observed on that cyclone's operation.

DESCRIPTION OF AN EMBODIMENT

A broad embodiment of the present invention resides in an apparatus comprising an elongated transfer line connected to reception vessel which contains two cyclone separation means; the first cyclone separation means effect separation of oil and catalyst effluent from said transfer line and the separation of oil and catalyst from a dense phase fluidized bed located within the reception vessel while the oil effluent from the first cyclone separation means is passed into a second cyclone separation means to effect the further separation of oil vapors from entrained catalysts after which a substantially catalyst free oil vapor is recovered from said second cyclone separation means.

We claim:

1. In an apparatus for contacting and separating particles from a fluid stream, a reception vessel providing a zone at its lower portion thereof, for a fluidized, partially deactivated catalyst bed in dense phase, an inlet in said lower portion for a feed stream to fluidize said bed and pass feed therethrough, a substantially external, upwardly extended, and elongated reaction zone conduit, said conduit having a relatively large ratio of its length over its inside diameter, an inlet at the lower portion of said conduit adapted to receive a catalyst laden hydrocarbon stream, an outlet at the upper end of said conduit, a first centrifugal separation means within said vessel in the upper portion thereof having a first inlet means in open communication with the internal portion of said reception vessel, said first inlet means being positioned and adapted for reception of stripped vapors from said dense phase of said fluidized bed and vapors from said feed stream, a second inlet means in said first centrifugal separation means connected to said outlet of said reaction zone conduit, said first centrifugal means having an outlet, a second centrifugal separation means similarly disposed within the upper portion of said reception vessel having an inlet connected to said outlet of said first centrifugal separation means, said second centrifugal separation means having an outlet, said outlet of said second centrifugal separation means comprising a second conduit extending exterior to said vessel and adapted to pass a clean stream out of said vessel, each of said first and said second centrifugal separation means having a dip-leg at the lower portion thereof, said dip-legs terminating below the uppermost boundary of said dense phase fluidized bed to thereby discharge separated catalyst directly thereto.

2. The apparatus of claim 1 further characterized in that each of said dip-legs communicates with the lower interior portions of said reception vessel and the latter has an outlet port from a lower portion thereof.

References Cited

UNITED STATES PATENTS

| 2,763,601 | 9/1956 | Martin et al. | 208—164 X |
| 2,763,600 | 9/1956 | Adams et al. | 208—161 X |
| 3,355,380 | 11/1967 | Luckenbach | 23—288 S X |
| 2,820,072 | 1/1958 | Wood et al. | |
| 3,248,319 | 4/1966 | Bowles et al. | 208—164 X |
| 3,261,776 | 7/1966 | Baumann et al. | 23—288 S X |

JOSEPH SCOVRONEK, Primary Examiner

U.S. Cl. X.R.

34—57 A; 55—345, 390, 474; 208—153, 155, 164